United States Patent [19]

Nield et al.

[11] Patent Number: 5,314,751
[45] Date of Patent: May 24, 1994

[54] COATING PROCESS AND PRODUCT

[75] Inventors: Eric Nield, Beaconsfield; Riaz Ahmed, High Wycombe; Riaz A. Choudhery, Slough, all of England

[73] Assignee: Imperial Chemical Industries PLC, London, England

[21] Appl. No.: 91,820

[22] Filed: Jul. 13, 1993

Related U.S. Application Data

[63] Continuation of Ser. No. 709,578, Jun. 5, 1991, abandoned.

[30] Foreign Application Priority Data

Jun. 19, 1990 [GB] United Kingdom ............... 9013663

[51] Int. Cl.$^5$ .............................................. B32B 27/36
[52] U.S. Cl. .................................. 428/412; 427/385.5; 427/388.5; 428/458; 428/474.4; 428/480
[58] Field of Search ..................... 427/385.5, 388.5; 428/412, 458, 474.4, 480

[56] References Cited

U.S. PATENT DOCUMENTS

| | | | |
|---|---|---|---|
| 4,153,782 | 5/1979 | Coney | 204/181.7 X |
| 4,267,310 | 5/1981 | Landoll | 525/69 X |
| 4,849,297 | 7/1984 | Mansell | 106/14.39 X |

FOREIGN PATENT DOCUMENTS 1264953 12/1961 France .
1201523 8/1970 United Kingdom .

Primary Examiner—Michael Lusignan
Attorney, Agent, or Firm—Cushman, Darby & Cushman

[57] ABSTRACT

A process for forming a coating on a surface of a substrate which comprises;
(i) applying a layer of a composition comprising a polymer phase, in which the polymer phase comprises a crystallisable polymer selected from polyesters, polyamides, and polycarbonates, in intimate admixture with a non-curable solvent for the crystallisable polymer, and,
(ii) heating the applied layer to a temperature at least high enough to cause film formation.

7 Claims, No Drawings

COATING PROCESS AND PRODUCT

This is a continuation of application Ser. No. 07/709,578, filed on Jun. 5, 1991, which is abandoned.

This invention relates to a process for forming a coating using composition which comprises a crystallisable polymer in intimate admixture with a non-reactive solvent. The composition can be in the form of a dispersion in an inert liquid or in the form of a powder. The invention also relates to a substrate when coated by the process.

Crystallisable polymers are well known. They include polyesters such as polyethylene terephthalate (PET) polybutylene terephthalate (PBT) (these usually have a density of about 1.4 and 1.3 g/cm$^3$ respectively), or copolymers of ethylene glycol and a mixture of terephthalic and isophthalic acids (PET/I), polycarbonates, and polyamides (often called nylons).

A fuller description of the various types of polyester, polycarbonate or nylon is given in the third edition of Kirk-Othmer's "Encyclopaedia of Chemical Technology" published by John Wiley & Sons of N.Y in 1982, see Volume 18 pages 549 to 574 pages 479 to 494 or pages 406 to 425 for polyesters, polycarbonates and nylons respectively. The pages are herein incorporated by reference.

Examples of useful polyester copolymers include polyethylene terephthalate, copolymers comprising both terephthalic and isophthalic acid and elastomeric polyesters having segments of a low glass transition temperature, such as polyester-polyether block copolymers some of which are commercially available from E. I. DuPont de Nemours under the Trade Mark Hytrel.

Examples of useful polyamides are nylon 6,6, nylon 6 and copolymers of these.

Polyamides also include recently available nylon 4, 6 and so called partially crystalline aromatic nylons. Aromatic nylons are polyamides comprising condensates of aromatic dismines such as 1,3-di(aminomethyl) benzene.

Examples of useful polycarbonates are 2,2-bis (4 hydroxyphenol) propane (Bisphenol A) polycarbonate commercially available from Anic Spa of Italy under the Trade Mark Sinvet.

Some of the above crystallisable polymers can acquire a partially crystalline form merely by solidifying from the molten state whilst some (notably the polycarbonates and some polyesters) are amorphous as supplied but may be easily converted to partially crystalline form by exposure to solvents. It is for this reason that the polymers are herein described generically as "crystallisable" rather than "crystalline".

In general, crystallisable thermoplastic polymers have many properties such as toughness, hardness, abrasion resistance and flexibility which make them potentially useful as coating materials.

However, most attempts to incorporate crystallisable thermoplastic polymers into coatings have involved physically grinding the polymer so as to form a polymer powder which is then mixed into a liquid coating composition. These attempts have led to highly inhomogenous structures which because of their inhomogeneity have shown relatively poor properties in the coating.

A coating composition comprising a crystallisable polymer having improved homogeneity is described in unpublished copending European Patent Application number 89313522.8. This Application describes a non-attritive process for producing particles of a crystallisable polymer which contain an entrapped solvent for the polymer. One process which is described therein comprises dissolving the crystallisable polymer in a moderate solvent at a temperature above the crystalline melt temperature of the polymer when in the solvent and then allowing the solution to cool so as to cause solid/liquid phase separation of solid polymer.

The result of this process is a dispersion in the solvent of particles of crystallisable polymer which contain imbibed solvent. The process may be carried out using a crosslinkable solvent. Alternatively, a non-crosslinkable solvent may be used.

It is an object of the present invention to provide an alternative composition which comprises a crystallisable polymer intimately admixed with a non-reactive solvent for the crystallisable polymer.

According to the present invention there is provided a process for forming a coating on a surface of a substrate which comprises:

(i) applying a layer of a composition comprising a polymer phase, in which the polymer phase comprises a crystallisable polymer, selected from polyesters, polyamides and polycarbonates, in intimate admixture with a non-crosslinkable solvent for the crystallisable polymer, and (ii) heating the applied layer to a temperature at least high enough to cause film formation.

The polymer phase can be in the form of a dispersion in a non-aqueous continuous diluent or can be in the form of a powder.

When the composition is in the form of a dispersion it can comprise liquid droplets or solid particles of the polymer phase dispersed in the diluent. Preferably the composition comprises solid particles of the polymer phase dispersed in the diluent.

Solid means having a tack temperature of greater than 60° C. Tack temperature is measured by isolating some of the dispersed phase, for example by evaporating off the diluent, and applying a dry sample of this onto a surface having a known graduated temperature such as a Kohfler bar. After 1 minute, an attempt is made to brush off the residue using a small soft paintbrush. The temperature above which the residue is not removable in this way is called the Tack Temperature. Preferably the Tack Temperature is greater than 80° C.

The size of the droplets or particles of the polymer phase is generally between 0.1μ and 500μ, preferably between 0.5μ and 50μ.

When the polymer phase is in dispersion in a non-aqueous continuous diluent the droplets or particles most preferably are between 0.5 and 10μ. When the polymer phase is in the form of a powder, it most preferably has particle size of 10 to 50μ.

Preferably, the weight ratio of the solvent to the crystallisable polymer in the polymer phase is from 5:85 to 85:15, more preferably 10:90 to 70:30, most preferably 10:90 to 50:50.

Preferably, the polymer phase comprises at least 5% by weight of the composition, more preferably from 20 to 80% by weight of the composition and most preferably from 40 to 70% by weight of the composition.

The crystallisable polymer can comprise a single crystallisable polymer or a blend of two or more crystallisable polymers.

Preferably the crystallisable polymer is a polyester or a polycarbonate, most preferably a polyester.

The non-crosslinkable solvent is a material which can form a homogeneous solution together with the crystallisable polymer, and which does not crosslink with any of the components of the composition.

By "form a solution" is meant that there is a temperature at or above ambient temperature above which the mixture of the solvent and the crystallisable polymer when pure will form a homogeneous single phase liquid solution which is clear to the unaided eye. Ambient temperature is generally between 10° and 25° C.

Preferably the solvent, and crystallisable polymer are chosen such that they will only form a homogeneous solution when mixed together on heating them above ambient temperature for example 40°, preferably 100°, and most preferably 180° C. above ambient temperature.

Examples of suitable non-crosslinkable solvents are dimethyl phthalate, and propylene carbonate.

When the polymer phase is in the form of a dispersion in a non-aqueous continuous diluent then the composition also comprises a stabiliser.

The stabliser is a material which stabilises the dispersed particles or droplets of the polymer phase in the diluent phase so as to prevent or retard the settling out or flocculation of the particles or droplets. It also facilitates the formation of the dispersion.

The stabiliser comprises two covalently bonded components, a component which is soluble in, or solvatable by, the diluent, referred to as the solvated component, and a second component which is reacted with or associated with the polymer phase, referred to as the anchor component.

The nature of the solvated component depends on the identity of the continuous diluent. For example, when the continuous diluent is an aliphatic hydrocarbon then the solvatable component can be a hydrocarbon chain or a polybutadiene chain.

The anchor component can be one which reacts with or associates with the polymer phase.

Examples of suitable anchor components which associate with the polymer phase are polar acrylate and methacrylate polymers, and vinyl pyrrolidone polymers.

Examples of anchor components which can react with the polymer phase are acid group containing moieties, anhydride groups or epoxy containing groups.

These types of stabilisers are well known in the art and can be chosen from a large number of commerically available material or made using standards techniques.

The polymer phase can also comprise a non-crystallisable polymer for example a rubber. Preferably the polymer phase comprises less than 80% by weight of non-crystallisable polymer, more preferably less than 50% and most preferably less than 10%.

The continuous diluent can comprise any non-aqueous liquid which is immiscible with the crystallisable polymer. This means that the polymer phase is a discrete phase when in dispersion in the continuous diluent. Preferably the diluent does not react with any of the components of the polymer phase. Examples of suitable diluents are hydrocarbons such as $C_{10-20}$ hydrocarbons.

The compositions of the invention can also comprise other conventional coating components such as pigments, extenders, cosolvents and surfactants, and other film-forming resins.

The compositions in which the polymer phase is in the form of a dispersion in a non-aqueous diluent can be made by a process which comprises forming a substantially homogeneous liquid solution of the crystallisable polymer in the non-crosslinkable solvent and subsequently emulsifying this liquid solution in the diluent.

The process for making this type of composition comprises the steps of;

(i) forming a homogeneous liquid solution of the crystallisable polymer in the non-crosslinkable solvent, (ii) forming an emulsion by emulsifying the solution in a non-aqueous continuous diluent in the presence of a stabiliser, at a temperature at which the solution is a homogenous liquid, the diluent being chosen so as to be immiscible with the crystallisable polymer at the temperature at which the emulsification is carried out, and, where the emulsion is formed at a temperature above ambient temperature, (iii) allowing the emulsion to cool to ambient temperature.

A homogeneous solution is one which is substantially clear to the unaided eye. The homogeneous liquid solution of the crystallisable polymer in the non-crosslinkable solvent can be made by mixing the pure polymer and the solvent together and if necessary raising the temperature. Generally the mixture is physically agitated, for example stirred, to speed the dissolution process.

The solution so formed can be one of two types. Either it can be a Crystallisable solution or it can be a Permanently Amorphous solution.

Crystallisable Solutions have a crystalline melt temperature ($T_m$) of the polymer in the solution. Crystallisable polymer can be made to recrystallise from this type of solution if the solution is cooled slowly from above its crystalline Melt Temperature $T_m$.

Solutions which are permanently amorphous do not exhibit a crystalline Melt Temperature. The crystallisable polymer can not be made to recrystallise from Permanently Amorphous solutions.

The crystalline Melt Temperature ($T_m$) of the polymer in the solution can be determined by differential scanning calorimetry (DSC). The method to determine $T_m$ for the polymer in any given solution involves firstly determining the Crystalline Melting Point ($T_m$) for the pure crystalline polymer. The value of the $T_m$ for the pure crystalline polymer is then used in the determination of the $T_m$ for the solution.

The values of $T_m$ for a large number of known polymers are available from the literature. Alternatively, the $T_m$ for any crystallisable polymer can be experimentally determined.

In order to determine experimentally $T_m$ for the pure polymer a test cycle is carried out in which 10 mg of the polymer is heated in a DSC machine to 285° C. at a rate of 20° C./min and subsequently cooled at a rate of 20° C./min to ambient temperature. The $T_m$, if present, is seen as an endothermic peak on the graph of absorbed against temperature as the temperature is raised.

Certain crystallisable polymers or mixtures of crystallisable polymers exhibit more than one endothermic peak. In these cases $T_m$ is taken to be at the peak which is highest in temperature.

Certain crystallisable polymers do not show an endothermic peak due to $T_m$ during the test cycle. This is because they are in a metastable amorphous state when supplied. In this case, the polymer is converted to a crystalline state and the test is then repeated. The crystallisable polymer can be made crystalline by contacting it with a suitable solvent such as a low-molecular weight ketone, for example acetone or methyl ethyl ketone so as to cause crystallisation. The test cycle is then repeated and a value for $T_m$ obtained.

In order to determine $T_m$ for the solution under consideration, a test solution is made up by heating the desired mixture of the pure crystallisable polymer in powder form with a particle size less than $250\mu$, and solvent with stirring to a temperature 20° C. above the $T_m$ of the pure polymer. The test solution is held at this temperature for 5 minutes before being allowed to cool to ambient temperature.

The test solution is subjected to a test cycle in which 10 mg of the solution is heated in the DSC to a temperature equal to $T_m$ for the pure polymer at a rate of 20° C./min and subsequently cooled to ambient temperature at a rate of 20° C./min.

Again, as with the pure polymer $T_m$ is seen as an endothermic on the graph of heat absorbed against temperature and where more than one peak appears the value for $T_m$ is taken from the highest peak.

Certain mixtures do not show an endothermic peak due to $T_m$ in the heating/cooling cycle. When no endothermic peak appears, a fresh sample solution is annealed by heating to an Annealing Temperature and holding it at that temperature for 1 hour. The Annealing Temperature is defined with reference to the $T_m$ of the pure crystallisable polymer. The Annealing Temperature is 80° C. below the $T_m$ of the pure crystallisable polymer.

A further heating/cooling cycle is then carried out. If no endothermic peak is then observed, annealing is carried out on fresh samples for 2, 3, 4 and 5 hours after each of which a heating/cooling cycle is carried out. Once an endothermic trough does appear then the value of $T_m$ is recorded from this cycle. If after five hours annealing at this temperature still no trough appears, then the annealing procedure is repeated at a temperature 100° C. below the $T_m$ of the pure polymer.

If after 5 hours at 80° C. below the $T_m$ of the pure polymer and 5 hours at 100° C. below the $T_m$ of the pure polymer then still no peak appears the mixture is said to have no Crystalline Melt Temperature $T_m$. The resulting solution is referred to as a Permanently Amorphous Solution.

Where a $T_m$ is measured then recrystallisation of the polymer from the solution can occur at temperatures at or above ambient temperature. The resulting solution is then referred to as a Crystallisable Solution. Preferably the solution is a Crystallisable Solution.

Preferably the crystalline melt temperature of the polymer in the solution is above 100° C. more preferably above 130° C. most preferably above 150° C.

The emulsification step (ii) can be carried out using conventional emulsifying apparatus such as a high speed stirrer or ultrasonic disperser. One particularly convenient high speed stirrer is a Silverson high speed stirrer available from Silverson Ltd.

The emulsification can be carried out by first adding the solution to the diluent and then applying shear using the emulsifying apparatus. Alternatively, shear may be applied initially to either the solution or the continuous diluent and the other component slowly added. A further possibility is to first form a mixture of the polymer, the stabiliser, the solvent and the diluent and then to apply shear to this mixture at a temperature at which the polymer will dissolve in the solvent.

When the crystallisable polymer and the non-crosslinkable solvent can form a homogeneous solution at ambient temperatures then the emulsion step (ii) can be carried out at or above ambient temperature.

When the crystallisable polymer and the non-crosslinkable solvent will only form a homogeneous solution at elevated temperature then the emulsion is carried out at a temperature at or above that elevated temperature.

When the solution is Crystallisable, the morphology of the dispersed polymer phase at ambient temperature depends on the rate at which the emulsion is allowed to cool to ambient temperature.

Generally, if the emulsion is allowed to cool slowly then recrystallisation of the crystallisable polymer will occur and the resulting composition comprises a dispersion in which the polymer phase contains recrystallised polymer. Slowly means at a rate no faster than 20° C. per minute, for example 1° C. per minute.

Rapid cooling of the emulsion results in a dispersion of particles or droplets in an amorphous state. Rapid cooling generally means at a rate faster than 50° C. per minute.

The size of the droplets or particles of the polymer phase depends on the viscosity of the solution at the temperature at which the emulsion step is carried out, the degree of agitation and the quantity of stabiliser used. A lower solution viscosity, a greater degree of agitation, or a larger quantity of stabiliser will give rise to smaller droplets or particles.

Preferably the crystallisable polymer is chosen so that it redissolves or softens in the solvent during film formation after evaporation of any diluent and at the temperature at which film formation occurs.

When the polymer phase is in the form of a powder it can be made by separating solid particles of polymer phase from the continuous diluent phase of a dispersion as described above.

The powder is isolated by the steps of;

(iv) isolating the solid polymer phase particles from the composition produced in step (iii), and (v) allowing the isolated particles to dry so as to remove the diluent.

The particles of polymer obtained contain entrapped non-crosslinkable solvent.

Optionally the isolated particles can be rinsed with a liquid which is not a solvent for the particles, in order to remove any unwanted residues of the continuous phase.

The particles can be isolated by filtering or by centrifuging. Filtering can be carried out by passing the emulsion through a filter medium for example filter paper or sintered glass.

Preferably the particles of polymer phase have a size of from $10-50\mu$ when it desired to isolate them by the modified process. Particles in this size range are easy to isolate and are of a size suitable for use in coatings application.

It has been found that a powder containing entrapped solvent has improved flow properties when used in powder coating applications.

In a further modification of the process the particles may be subjected to a solvent removal step in which the entrapped solvent is removed from the particles for example by extracting the particles and evaporating off the remaining solvent in an oven.

These polymer particles with or without entrapped solvent can be redispersed in a liquid carrier so as to form a redispersed particle composition which is a liquid composition containing the redispersed particles.

The liquid carrier in which the particles are redispersed can be the same as the continuous diluent from which the particles are isolated or it can be different. Preferably it is different. The liquid carrier can for example be a coating composition which can be based on an organic solvent or water. Coating Compositions typically comprise a film-forming polymer and a liquid diluent. Typical binders for coating compositions are described in the third edition of the book 'Introduction to Paint Chemistry' by G P A Turner published by Chapman and Hall of London in 1988.

The particles can be redispersed under low shear conditions for example by stirring the particles in the liquid carrier.

The compositions can be applied to the substrate by conventional application means. Examples of conventional application means for liquid compositions are brushing, spraying, dipping or roller-coating. An example of a conventional application means for powder is electrostatic spray.

Typically the applied layer is heated to between 50° and 300° C. most typically between 150° and 250° C. Typically the layer is heated for between 15s and 15 minutes so as to cause film formation.

The surfaces coated according to this invention can be metallic for example aluminium, stainless steel or non-metallic, for example glass, wood, paper or textile. The composition can be used to impregnate continuous rovings of a wide variety of fibres including glass and carbon fibres by application to the surface of the fibres. The impregnated fibres, can be shaped during curing to produce a composite which on cooling comprises fibre consolidated in cured solvent.

In particular the composition can be used to coat sheets (especially metal sheets which are to be used in shaping processes), and shaped articles such as cans for example food or beverage cans.

The invention also provides a substrate when coated by the above process.

The process can also be used to form free films, that is sheets of composition unsupported by being adhered to a substrate. These sheets can be made by first forming a cured coating by the above process followed by peeling the coating from the substrate.

The invention will be illustrated by the following examples:

EXAMPLES

Preparation of Dispersant

The following dispersant was used in making compositions according to the invention.

Dispersant A:
Polybutadiene/Methylmethacrylate/Methacrylic Acid Dispersant

| Charge 1 | |
|---|---|
| Toluene | 396.14 |
| Polybutadiene (Lithene N4 5000) | 199.74 |
| White Spirit | 197.74 |
| Charge 2 | |
| Methyl Methacrylate | 187.74 |
| Methacrylic acid | 11.98 |
| Lucidol P 25 (Benzoyl peroxide containing 25% water) | 5.33 |

Lithene is a Trade Mark of Revertex

Charge 2 was added over 1.5 hours to Charge 1 at 120°–125° C., reflux temperature. After a further 0.5 hours 1.33 parts of Trigonox 21B 70 (tertiary butyl per-2-ethyl hexanoate, Trigonox is a Trade Mark of Ciba Chemicals) was added, and heating was continued for a further hour. Solvent (99.1 parts) was removed by distillation and replaced by an equal volume of white spirit.

The product was opalescent with a viscosity of 0.5 to 1.0 Pas and a measured solid content of 37%.

COMPOSITIONS

Compositions 1 to 6B

Compositions 1 to 4, 5B and 6B show the preparation of various compositions according to the invention. Compositions 5A and 6A are comparative compositions having no non-crosslinkable solvent in them. The compositions were made according to The method below and using the components set out in Table 1. The $T_s$ for each composition together with the dispersion size and range for each is given in Table 2.

Method

The polymer, and solvent were heated to temperature $T_s$ at which a homogeneous solution was obtained. This solution was added to a mixture of the inert diluent and any dispersant, which had been preheated to 200° C.

The solution was emulsified in the diluent using a laboratory homogeniser (silverson L2R made by Silverson Machines Ltd of Chesham, UK) fitted with a fine mesh screen (0.5 mm). The emulsification was carried out by immersing the homogeniser head in the diluent mixture, turning the homogeniser on to full power (ca.9000 rpm) and then adding the solution over a period of 1 to 2 minutes, with the temperature of the emulsion being maintained at about 220° C. The emulsification was continued for a further five minutes. The resulting milky emulsion was cooled using an ice-water bath while the homogeniser was reduced to half power,(ca.5000 rpm), until the temperature had reached 60° C. The cooling rate was between 20°–30° C./min. in each case. The homogeniser and ice-bath were removed and the composition was allowed to cool to ambient temperature (about 20° C.).

TABLE 1

Table 1 lists the components for Compositions 1 to 6B which were all made according to the Method given above. The percentage of Dispersant is by non-volatile weight on the total weight of the crystallisable polymer plus the solvent. The abbreviations used in the table are as follows:

ABBREVIATIONS FOR TABLE 1

Crystallisable Polymers

PET is a homopolymer of ethylene glycol and terephthalic acid, with an intrinsic viscosity of 0.64 to 0.66 $cm^3/g$ in orthochlorophenol at 25° C.

PET/I is a copolymer of ethylene glycol and a mixture of terephthalic and isophthalic acids in an 82:18 ratio, with an intrinsic viscosity of 0.63 to 0.65 $cm^3/g$ in orthochlorophenol at 25° C.

PBT is a homopolymer of butylene terephthalate available from Atochem under the Trade Mark Orgater TNM O.

PC is a polycarbonate available from Anic Spa. of Italy under the Trade Mark Sinvet 251.

Solvents

The solvent used was dimethyl phthalate.

Dispersants

Dispersant A is prepared as described above.

Diluents

The Diluents used were aliphatic hydrocarbon available from Exxon Chemicals under the Trade Mark Exxsol D100, and Exxsol D140.

TABLE 1

COMPOSITIONS

| Comp. | Crystallisable Polymer | Solvent | Dispersant A | Inert Diluent |
|---|---|---|---|---|
| 1 | PET/I (80 g) | 20 g | 8% | D100 (100 g) |
| 2 | PC (30 g) | 36 g | 8% | D100 (100 g) |
| 3 | PET (45 g) | 32 g | 8% | D100 (100 g) |
| 4 | PBT (48 g) | 12 g | 8% | D100 (100 g) |
| 5A | PBT (35 g) | None | 8% | D140 (150 g) |
| 5B | PBT (35 g) | 10.5 g | 8% | D140 (139 g) |
| 6A | PET/I (30 g) | None | 8% | D140 (130 g) |
| 6B | PET/I (30 g) | 10 g | 8% | D140 (120 g) |

TABLE 2

$T_S$ and dispersion size and range for the compositions given in Table 1. Dispersion size and range was measured using an optical miscrope.

| Composition | $T_S$ | Average Particle Size ($\mu$) | Dispersion Size Range ($\mu$) |
|---|---|---|---|
| 1 | 220 | 70 | 40–100 |
| 2 | 240 | 40 | 4–60 |
| 3 | 250 | 20 | 4–60 |
| 4 | 230 | 20 | 10–100 |
| 5A | 240 | 5 | 1–10 |
| 5B | 240 | 25 | 5–50 |
| 6A | 220 | 40 | 2–55 |
| 6B | 220 | 10 | 1–20 |

Coatings;—Comparative Examples

Compositions 5A and 5B were applied to aluminium panels (300 mm × 100 mm × 0.9 mm) by means of a 'K-bar'. K Bars are stainless steel bars, wound with stainless steel wire of selected diameters, to give predetermined wet film deposits. ("K-bars" are supplied by R K Print-Coat Instruments Ltd, Royston, Herts (UK). The panels were stoved in an oven at 250° C. for 3 minutes and were then quenched cooled immediately by immersing the panels in a water bath at room temperature. The resulting coatings were clear and glossy with film thicknesses of between 30–33μ. The coatings were subjected to a Reverse Impact Test according to ASTM Test D 4145-83 (Resistance of Organic Coatings to the effects of Rapid Deformation). It was found that coatings from composition 5A had a impact resistance less than 5 lb-in whilst those from 5B were able to withstand impacts greater than 40 lb-in.

Compositions 6A and 6B were applied to aluminium panels and stoved at 210° C. for 3 minutes. The resulting coatings derived from composition 6A were bitty, poorly coalesced whilst those from 6B were smooth and glossy.

Coatings using non-aqueous dispersions (i) Preparation of non-aqueous dispersion of Epikote 880. Epikote 880 (a bisphenol A/epichlorohydrin type epoxy resin of epoxide equivalent weight 182–194 available from Shell Chemicals, 92 g), Dispersant A (21.6 g) and Exxsol D100 (100 g) were emulsified together using a Silverson high speed stirrer. The milky emulsion consisted of fine droplets of average size of about 1 micron.

(ii) The dispersion from (i) above (20 g) was mixed with Synprolam 35N3 (a dismine resin available from ICI Plc, 10 g) to give composition 7. Epikote 880 NAD (6g) was mixed with 20g of composition 6B (see table 1) and Synprolam 35N3 (3 g) to give Composition 8.

Compositions 7 and 8 were applied to aluminium panels (300 mm × 100 mm × 0.9 mm) using K-bar number 8 and stoved at 230° C. for 15 minutes.

The resulting coating were smooth and glossy of film thickness 25 μ. Coatings derived from composition 7 withstood 10 double MEK rubs whilst the coating of Composition 8 had a double MEK rub value of 20. Reverse impact test on the coatings revealed that upon an impact of 5 lb-in Composition 7 is removed from the aluminium substrate whilst the coating of formulation 8 remained intact.

We claim:

1. A process for forming a coating on a surface of a substrate which comprises:
   (i) applying a layer of composition comprising a polymer phase in dispersion in a non-aqueous continuous diluent, in which the polymer phase comprises an effective film-forming amount of a crystallisable polymer, selected from polyesters, polyamides, and polycarbonates, in intimate admixture with a non-crosslinkable solvent for the crystallisable polymer, said polymer phase and diluent being immiscible so as to provide the dispersion thereof and an effective amount of a stabilizer sufficient to maintain the polymer phase dispersed in the diluent and
   (ii) heating the applied layer to a temperature at least high enough to cause film formation.

2. A process according to claim 1 in which the weight ratio of the solvent to the crystallisable polymer in the polymer phase is from 5:85 to 85:15.

3. A process according to claim 1 in which the polymer phase comprises at least 5% by weight of the composition.

4. A process according to claim 1 in which the crystallisable polymer is a polyester.

5. A process according to claim 1 in which the non-crosslinkable solvent comprises dimethyl phthalate, or propylene carbonate.

6. A process according to claim 5 which comprises solid particles of the polymer phase dispersed in the diluent.

7. A substrate when coated by the process of claim 1.

* * * * *